United States Patent Office 3,370,882
Patented Feb. 27, 1968

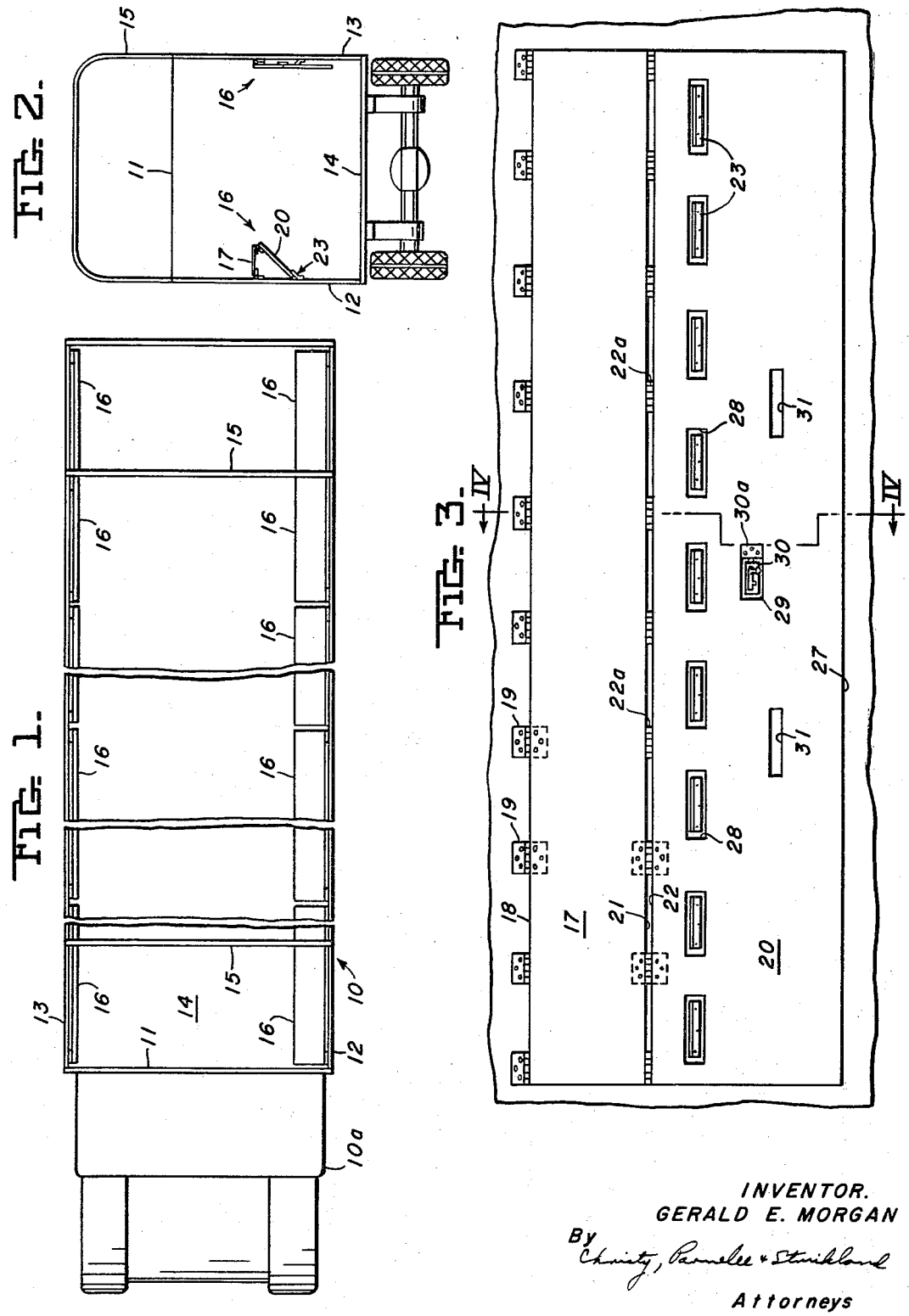

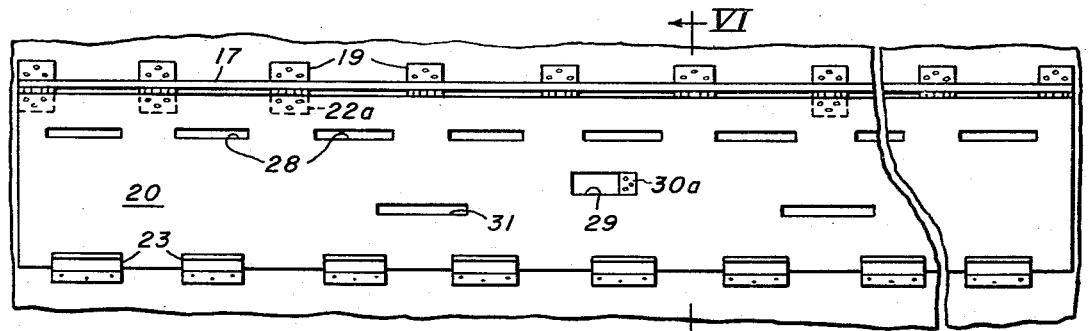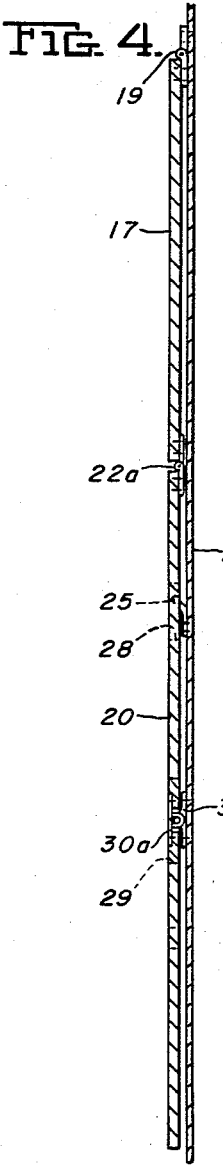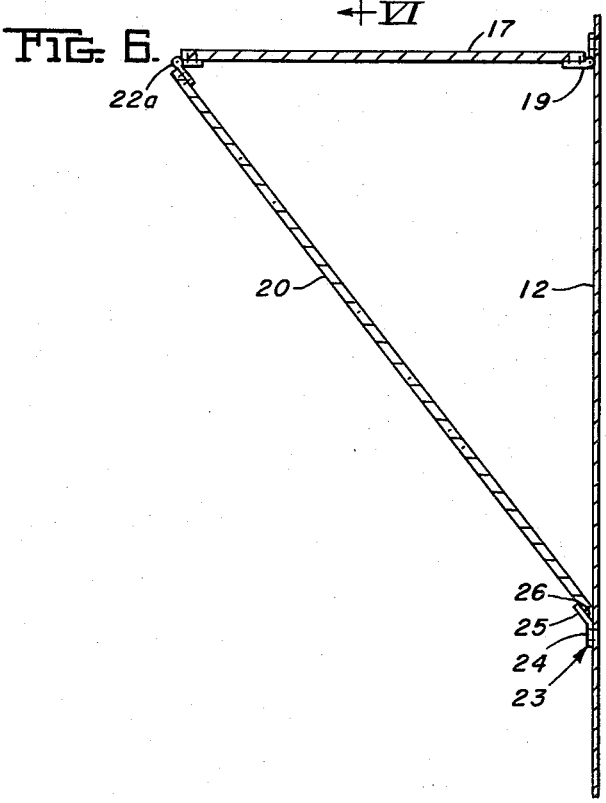

3,370,882
COLLAPSIBLE WALKWAY
Gerald E. Morgan, 2425 8th Ave.,
Beaver Falls, Pa. 15010
Filed July 23, 1965, Ser. No. 474,309
3 Claims. (Cl. 296—1)

ABSTRACT OF THE DISCLOSURE

This invention relates to a collapsible walkway and particularly to such a walkway for mounting on the side walls of a cargo-carrying vehicle. The walkway comprises a first generally rectangular plate member forming the tread portion of the walkway, the plate being hinged along its upper edge to the sidewall of the vehicle. A second generally rectangular plate member forming a support member, is hingably connected at its upper edge to the lower edge of the tread member. There are a series of support cleats mounted on the sidewall and adapted to supportably engage the lower edge of the support member. In this manner the two plates may hang in a rest position parallel to and substantially flush against the vehicle sidewall, and may be raised to a position whereat the tread plate extends at right angles to the sidewall where it is supported by the support plate resting on the cleats. The support plate further has a series of openings therein intermediate its upper and lower edges so that the cleats are disposed within these openings when the plates are in a rest position. Latch means cooperating with the sidewall and the plates are provided to hold the plates in the rest position. With the described arrangement the plates will lie substantially flush against the sidewalls when in the rest position and will not interfere with cargo or take up any substantial amount of valuable cargo space.

---

The invention is specifically described in connection with a high-sided, open top truck trailer wherein the walkway is mounted on the interior side walls. In trucks of this type the side walls are usually about seven feet high and have a plurality of spaced arches along its length which extend upwardly above the tops of the side walls and transversely across the cargo bed. The cargo being transported is protected by a tarpaulin or the like which is rolled over and supported by the arches and secured on the side walls. When cargo is to be unloaded the cover member or tarpaulin must usually be removed. In present practices a man must ascend the side walls and travel along the narrow edges thereof while rolling and unrolling the tarpaulin. This is strenuous and dangerous for a man and accidents frequently result from loss of balance and the ensuing fall, either into the truck bed about seven feet below the side wall edge or onto the ground which is about twelve feet below the tops of the side walls. In some situations a man can walk on the cargo itself but many cargoes do not permit this and the above described method must be employed to cover and uncover the cargo.

According to the invention the interior side walls of the vehicle are provided with a collapsible walkway of novel construction which permits the safe and easy traverse of a man while covering and uncovering the vehicle and which when folded takes up little cargo space and offers no interference to the placement or removal of cargo. The walkway comprises a pair of plate members hingeably connected to each other along one longitudinal edge of each of the members. The opposite longitudinal edge of one plate is hingeably connected to the vehicle side walls whereby the plates can be positioned into and out of a rest position and a functional position. In the rest position the two plates hang suspended from the hinged connections between the side walls and the one plate, the other of the plates being suspended by the hinged connections between the two plates, whereby the plates lie in a vertical plane parallel to and adjacent the vehicle side walls.

In the functional position one plate extends horizontally outward perpendicular to the side walls to form the walkway area and is supported by the other plate which extends diagonally from the outer edge of the horizontal plate to a support means on the side wall. Preferably the plates are arranged so that the walkway-forming plate is the top plate when in rest position and the lower plate is suspended from this plate along their common hinged edges. The upper edge of the top plate is hinged to the side walls. On the side walls, spaced below the hinges of the top plate and above the lowermost reach of the lower plate, there are support means which can engage the lower edge of the lower or support plate when the upper plate is swung into the horizontal. The plates and various supports are arranged so that the plates can lie fairly flush against the sidewalls when not in use and means are also provided for locking the plates against the sidewalls when not in use so that the device is as unobtrusive as possible. Desirably the device is built in sections which together make up a walkway extending substantially the full length of the vehicle on both sides thereof.

An object of the invention is to provide a new and useful collapsible walkway for cargo-carrying vehicles.

Another object is to provide a cargo-carrying vehicle with a collapsible walkway.

These and other objects will be apparent to those skilled in the art and more fully understood by reference to the following description, wherein:

FIG. 1 is a plan view, partly schematic, of a cargo trailer with a collapsible walkway mounted thereon;

FIG. 2 is an end elevation of FIG. 1;

FIG. 3 is a side elevation of a walkway section in rest or retracted position;

FIG. 4 is an end elevation along the line IV—IV of FIG. 3;

FIG. 5 is a side elevation of a walkway section in the extended position; and

FIG. 6 is an end elevation along the line VI—VI of FIG. 5.

Referring first to FIGS. 1 and 2, 10 is a typical high-sided, open top cargo-carrying trailer with a tractor 10a, shown more or less schematically. The trailer has an end wall 11 and two side walls 12 and 13 which usually extend seven (7) feet more or less above the trailer bed 14. Spaced along the length of the trailer there are a plurality of arches or ribs 15 which extend transversely of the trailer bed and are attached to opposite side walls of the trailer. These arches extend above the upper edge of the side walls 12 and 13 and provide a support for a cover member such as a tarpaulin (not shown) which is rolled longitudinally of the trailer over the arches 15 and secured in any suitable manner to the trailer. Spaced above the trailer bed and attached to the interior side walls 12 and 13 there are a plurality of collapsible walkway sections 16 arranged end-to-end to form a substantially continuous walkway on each side of the trailer when the sections are in their extended positions. The sections 16 on side wall 12 (bottom of FIG. 1) are shown in extended, walkway-forming position while those on side wall 13 (top of FIG. 1) are shown in pendant or retracted position. Each of the sections 16 are substantially identical and can be made in any desired length, however, they are preferably of a size to permit easy manipulation by one man. In a typical forty-foot trailer, four sections nine-feet in length are satisfactory, allowing a few feet of clearance at one end of the bed and a few inches clearance between adjacent sections. Each section is large enough so that an inordinate number of sections are not required and small enough to be easily handled by one man.

Referring to FIGS. 3, 4, 5 and 6, the sections 16 are shown in detail. Each section 16 comprises an elongated rectangular plate member or tread panel 17 hingeably mounted along one of its long edges 18 to a trailer side wall by means of the hinged connections 19 at a convenient height below the top edges of the side wall. Preferably there are a plurality of connections 19 at suitable intervals to provide sufficient strength to support both the upper plate 17 and the lower plate 20, and to distribute the weight over a large area of the side wall which is usually made of light-weight aluminum sheets. Support panel or plate 20 is also an elongated rectangular member of greater transverse dimension than plate 17 and the two plates 17 and 20 are hingeably connected along their long edges 21 and 22 respectively by the hinge connections 22a. In the preferred embodiment illustrated, the lower edge 21 of plate 17 is hingeably connected to the upper edge 22 of plate 20, the terms "lower" and "upper" referring to the relationship when the plates are in the rest or retracted position of FIGS. 2 and 3.

At spaced locations along the sidewalls there are mounted a plurality of longitudinally aligned cleats or brackets 23 each comprising a vertical portion 24 (FIG. 6) mounted against the sidewall and an outwardly turned upper portion 25 which defines a plate-receiving recess 26 with the vehicle sidewall. The brackets 23 are vertically spaced above the lower edge 27 of plate 20 when the latter is in rest position and below the lower edge 21 of plate 17. Preferably the brackets 23 are longitudinally spaced or staggered with relation to the hinge connections 19 for added strength when the walkway is in raised position and to further distribute the load. Thus, in extended or walkway-forming position, the plate 17 may swing to a horizontal position and be supported therein by plate 20 which extends diagonally from its hinged connection with plate 17, downward into supporting engagement with the brackets 23 with the lower edge 27 of plate 20 resting in the recess 26.

Plate 20 is provided with a series of apertures or slots 28 which are so arranged that the brackets 23 are received therein when plate 20 is in rest position, as best seen in FIG. 3. Thus, the plates 17 and 20 which may be formed of metal but desirably are of lumber or plywood, when in rest position, lie practically flush with the sidewalls in a vertical plane parallel to the sidewalls. Preferably the thickness of the plates is such, that as shown in FIG. 4, the outward projection 25 of bracket 23 does not extend into the interior of the trailer beyond the plane of the plate 20. This is to avoid snagging and interference with the handling of cargo or of a person loading or otherwise present in the truck. Plate 20 also has an opening 29 therein which in rest position receives a latching device 30 mounted on the sidewall. Device 30 is shown as a sliding bolt type latch that projects into an ordinary hasp 30a secured across one end of opening 29 with its loop turned toward the side wall, so that neither the latch nor its keeper extend beyond the plane of the plate 20. This latch holds the plate 20 in place to restrain flapping or the like when the walkway is retracted and there is no load bearing against it. Plate 20 is also provided with means for aiding in lifting and lowering the walkway into and out of operative position, comprising a pair of apertures 31 in the lower portion of plate 20 which enable a man to grip the plate for raising and lowering thereof.

When the plates 17 and 20 are raised to operative position, as shown in FIGS. 5 and 6, they define a triangle in cross-section with the vehicle sidewall. Plate 17 forms one leg and plate 20 the hypotenuse of the triangle. Plate 17 should be wide enough to provide adequate footing for a man to walk and work on it, e.g., 12 to 18 inches.

The collapsible walkway described provides a means for enabling a man to quickly and safely cover and uncover a highsided open top cargo-carrying vehicle. Little cargo space is taken up since the device is collapsible so that it extends only a fraction of an inch beyond the sidewalls of the vehicle. Moreover, the plates provide some protection for the sidewalls against rough contact with the cargo.

While one embodiment of the invention has been illustrated and described, it will be apparent to those skilled in the art that variations and modifications in the particular construction and arrangement of parts are possible within the scope and spirit of the invention.

I claim:
1. In combination with a vehicle having sidewalls and an open top, the improvement comprising a collapsible walkway mounted on a sidewall of the vehicle, the walkway comprising,
   (a) a pair of plates hinged to each other and to the sidewall and so arranged that the plates hang in a rest position parallel to the sidewall and are movable to an extended position wherein one of the plates extends at right angles to the sidewall to form a walkway and the other of the plates forms an acute angle with both the one plate and the sidewall, and
   (b) means on the sidewall for supporting the plates in rest and extended positions, wherein the walkway comprises a plurality of similar sections arranged end to end and extending the major part of the length of the vehicle with a clearance space between adjacent ends of the sections and wherein one of the plates is provided with an aperture, a sliding bolt-type latch mounted on the sidewalls and received within the aperture when the plates are in rest position and arranged so that the latch is slidable into restraining relation with the apertured plate when received within the aperture.

2. In a trailer type vehicle having a bed, vertical opposing sidewalls extending above the bed and an open top, the invention comprising a collapsible walkway mounted on the interior face of a sidewall, the walkway comprising
   (a) a pair of elongated generally rectangular plates, one of the pair having a transverse dimension greater than the other, the one plate being hingeably connected to a sidewall along one of its longitudinal edges and to the other plate along the other of its longitudinal edges whereby the two plates may hang in a rest position against the sidewalls with the one plate above the other, the lowermost edge of the other plate being free, and
   (b) a series of brackets mounted on the sidewall and adapted to receive the free edge of the other plate in detachable supporting engagement, the brackets being so arranged that when the free edge is engaged therewith the one plate is disposed substantially horizontally and at right angles to the sidewall to form a walkway and the other plate forms an acute angle with both the one plate and the sidewall and supports the one plate in its horizontal position, wherein the brackets extend outwardly from the sidewalls and the other plate is provided with a series of apertures which receive the brackets when the plates are in rest position whereby the plates may hang substantially flush against the sidewall.

3. In combination with a vehicle having sidewalls and an open top, the improvement comprising a collapsible walkway mounted on a sidewall of the vehicle, the walkway comprising,
   (a) a generally rectangular tread plate having upper and lower edges hingably mounted at its upper edge to the sidewall,
   (b) a generally rectangular support plate having upper and lower edges, hingably mounted at its upper edge to the lower edge of the tread plate, the support plate having a series of openings therein intermediate its upper and lower edges and extending lengthwise of the support plate, (c) a series of support cleats mounted on the sidewall and adapted to supportably receive the lower edge of the support plate when the latter is raised to a position whereat the tread plate is substantially at right angles to the sidewall, the cleats being positioned so as to be disposed within the openings in the support plate when the latter is in a rest position whereat both plates hang downwardly substantially parallel to the sidewalls, and (d) latch means cooperating with the plates and the sidewall to hold the plates in the rest position.

References Cited

UNITED STATES PATENTS

| | | | |
|---|---|---|---|
| 2,324,508 | 7/1943 | Johnson | 296—63 |
| 2,370,402 | 2/1945 | Gutman | 296—19 |

FOREIGN PATENTS 457,168  11/1936  Great Britain.

BENJAMIN HERSH, *Primary Examiner.*

P. GOODMAN, *Assistant Examiner.*